UNITED STATES PATENT OFFICE.

JOSEPH FRANKLIN GENT, OF COLUMBUS, INDIANA.

ART OF MAKING GRITS.

SPECIFICATION forming part of Letters Patent No. 302,198, dated July 15, 1884.

Application filed November 17, 1883. (No specimens.)

*To all whom it may concern:*

Be it known that I, JOSEPH F. GENT, a citizen of the United States, residing at Columbus, in the county of Bartholomew and State of Indiana, have invented certain new and useful Improvements of the Art of Making Grits; and I do hereby declare the following to be a full, clear, and exact description of the invention, such as will enable others skilled in the art to which it appertains to make and use the same.

In making grits from Indian corn it was customary heretofore to simply reduce the article known as "hominy," which is made by clipping the kernels of corn, to separate the hulls and germs, which are then removed by screening and winnowing.

In the process of making hominy a large percentage of the glutinous or starchy portion of the corn is lost or wasted.

The object of my invention is to manufacture grits in such a way that this loss or waste of the starchy portion of the corn may be avoided. To this end I proceed as follows: The corn is first thoroughly cleaned in the dry state. It is then steamed just enough to soften and toughen the germs and husks, so that they may not grind up in the reduction which follows, while the glutinous or starchy interior remains practically unaffected by the steam. The corn thus steamed is immediately coarsely ground or broken, preferably between corrugated rolls, reducing it to a coarse meal, composed of separated hulls, germs, and granules of the starchy portion mixed with some little finely-reduced starchy meal. This material is at once screened, to separate therefrom the hulls, as well as the fine meal. The remaining material, composed of coarse starchy granules and germs, is then sized into grades by means of suitable screens or sieves, and then, while the germs are still soft, submitted, each grade separately, to the action of a mechanical picker or germ-extractor, (such, for instance, as is described in an application for a patent filed by me November 19, 1883, Serial No. 112,085,) for picking or extracting the soft germs from the harder coarse starchy granules. Finally those remaining coarse starchy granules not small enough already are reduced by grinding to grits.

I do not claim herein the art of extracting germs from ground cereals described and claimed in the aforesaid application, nor the art of making germless cornmeal described and claimed in another application filed by me November 17, 1883, Serial No. 112,084.

I claim as my invention—

The improvement of the art of making grits, which consists of the following steps, substantially as before set forth, namely: first, steaming the corn just enough to soften and toughen the hulls and germs; second, coarsely grinding or breaking the steamed corn and separating the hulls and fine meal from the ground or broken material; and, third, picking the germs from the coarse starchy particles.

In testimony whereof I affix my signature in presence of two witnesses.

JOSEPH FRANKLIN GENT.

Witnesses:
E. T. WALKER,
W. M. HANNAY.